United States Patent Office 2,855,397
Patented Oct. 7, 1958

2,855,397

PROCESS OF REACTING CARBON-CONTAINING COMPOUNDS WITH SPECIFIED GRIGNARDS

Hugh E. Ramsden, Metuchen, N. J., assignor to Metal & Thermit Corporation, New York, N. Y., a corporation of New Jersey No Drawing. Application November 28, 1955
Serial No. 549,546

6 Claims. (Cl. 260—251)

This invention relates to processes for the preparation of organic alcohols, acids, esters, ketones and thio acids by reacting new organomagnesium chloride complexes with carbonic acid derivatives, carbon dioxide, carbon disulfide and carbon oxysulfide. This application is a continuation-in-part of application S. N. 489,764, filed February 21, 1955, now abandoned.

Considerable difficulty has been encountered in the past in the preparation of organomagnesium compounds of the general formula RMgCl wherein R is an aryl group, a vinyl group or a heterocyclic group. Of the aryl and heterocyclic magnesium chlorides only three are known in the prior art, namely phenyl-, thienyl-, and p-tolyl magnesium chlorides. These have not been produced commercially and have required extremes of temperature and pressure in their preparation.

It has been discovered that the above-mentioned organomagnesium compounds may be readily prepared in good yields by reacting magnesium with RCl wherein R is an aryl, vinyl or heterocyclic radical in the presence of a compound Q, hereinafter defined.

It is an object of the present invention to provide a process for reacting said organomagnesium chlorides with carbonic acid derivatives, carbon dioxide, carbon disulfide and carbon oxysulfide to yield useful products. It is also an object of this invention to provide several new products useful in industry.

The products of the present invention are made by reacting organomagnesium compounds of the general formula RMgCl, wherein R has the significance stated above, and is more specifically defined below, with carbonic acid derivatives such as chlorocarbonates and dialkyl carbonates; carbon dioxide; carbon disulfide; and carbon oxysulfide in a suitable medium. The preferred medium is the compound Q.

Compound Q is a substituted or unsubstituted heterocyclic compound (having 5 or 6 atoms in the ring) containing one oxygen atom in the ring structure; the other ring atoms being carbon with the exception that one nitrogen atom may be substituted for any carbon atom other than those carbon atoms adjacent to the oxygen. The heterocyclic compounds may contain a single unsaturated bond, as in dihydropyran. Compounds within this definition include tetrahydrofuran, tetrahydropyran, 2-methyltetrahydrofuran, 2-ethoxytetrahydropyran, tetrahydrofurfuryl ethyl ether, dihydropyran, dibenzofuran and N-methylmorpholine. Permissible substitutions being groups which are not reactive with organomagnesium chlorides, or with any of the other components and products of the reaction mixtures of the present process, and includes substituted and unsubstituted alkyl, aryl, alkoxy and aryloxy groups (all allowable substitutes being those unreactive to other components of the reaction mixture as specified hereinbefore). Where nitrogen replaces a carbon atom, hydrogen on the nitrogen atom must be substituted with a group unreactive to the reactants or reaction products. A further requirement for Q is that the oxygen must be available for electron donation, i. e., the free p-electrons present on the oxygen should be available for coordination with the organomagnesium chloride. Any large blocking groups in the 2 and 5 (6) position may restrict the availability of these electrons. Another way these electrons may be restricted in their availability is by p-pi resonance, as for example in furan, which is not operative. One double bond giving p-pi resonance, as in dihydropyran (which is operative) allows reactivity since the oxygen still has free p-electrons. Expressed in another fashion, the oxygen of the heterocyclic ring structure must be such that electrons of the oxygen atom are available for coordination and complex formation with magnesium. Since Q also apparently functions as a solvent, a Q which has a high melting point may still function in this invention, but if it is used as solvent, obviously the high melting point (e. g., above 90° C.) causes great difficulty in carrying out the reaction. Any liquid Q of any structure whatsoever (with the limitations specified hereinbefore) will work.

In one form of the invention the carbonic acid derivatives such as the chlorocarbonates and dialkyl carbonates; carbon dioxide; carbon disulfide; and carbon oxysulfide are reacted with the reaction mixture resulting from the reaction of magnesium and organic chloride in the compound Q as described herein, and then further reacted to give the products of the present invention. In this form of the invention the organomagnesium chloride reagents are present as a complex with the reaction medium which may be described as RMgCl·nQ. In the formula, R is an aryl group, a vinyl group or a heterocyclic group, as more particularly defined below, n is a small whole number and Q has the significance ascribed to it above. These organomagnesium chloride complexes are made by the reaction of the organic chloride RCl with magnesium in the presence of the compound Q as a reaction medium.

The compound Q, employed to promote reaction and to form a complex with the vinyl, heterocyclic or aryl magnesium chloride may be a simple 5 or 6 member heterocyclic compound containing one oxygen in the ring and having the requisite characteristics set forth above, e. g., tetrahydrofuran, tetrahydropyran, dihydropyran, etc. It may also be a 5 or 6 member heterocyclic compound containing one oxygen in the ring and further substituted by monovalent groups and having said characteristics, e. g., 2-methyltetrahydrofuran, 2-ethoxytetrahydrofuran, tetrahydrofurfuryl ethyl ether, N-methyl morpholine, etc. Furthermore, the compound Q may be a 5 or 6 member heterocyclic compound having one oxygen atom in the ring and substituted by polyvalent radicals to form fused ring compounds, providing that the compound has the necessary characteristics set forth above in the definition of compound Q, e. g., dibenzofuran, etc.

Ordinarily the carbonic acid derivatives such as chlorocarbonates and dialkyl carbonates; carbon dioxide; carbon disulfide and carbon oxysulfides are reacted with the organomagnesium chlorides at a temperature between —20° C. and the reflux temperature. However, the temperature is not particularly critical and may be as low as Dry Ice temperature for the carbon dioxide reaction. As will be discussed below, the initial product of reaction will react with a further quantity of organomagnesium chloride or complex under suitable conditions to form new products. These in turn, also under suitable conditions, will still further react with the organomagnesium reagent. When it is desired to stop at one of the intermediate products, it is preferred to add the organomagnesium reagent to the chlorocarbonate or other carbon dioxide derivatives since the reverse addition will usually result in the formation of some of the later products of the series.

The process of the present invention is useful in the production of several compounds that are already widely used in industry. Among the carboxylic acids may be mentioned, benzoic, acrylic, toluic, terephthalic and chlorobenzoic acids. Benzoic acid is used as a preservative in flour bleaching compositions and the sodium salt as a fungistat. Acrylic acid is used in paint compositions to improve the covering power of the paint and to increase the amount of pigment that may be incorporated in the paint. Acrylic acid is also used to produce ion exchange resins. The terephthalic acids are useful in the synthesis of perfumes and of polymer fibers. Chlorobenzoic acids are useful in the preparation of the dodecyl esters thereof which are reacted with amines to produce soap additives.

The benzophenones and the chlorinated benzophenones of this invention are useful as larvicides, lousicides and acaricides. p-Chloro and pp'dichlorobenzophenone are larvicidal to Anopheles at 10 parts per million. o-Chlorinated benzophenones are stomach poisons for Taeniola. Phenyl benzoate, benyl benzoate and cresyl benzoate made by the process of this invention are highly toxic to chiggers.

The novel products of the present invention are also generally useful as plasticizers, particularly for polyvinyl resins like polyvinyl chloride and for cellulose ester resins like cellulose acetate. They are also useful as stabilizers, insecticides, as additives for lube oil and rubber, and generally as chemical intermediates.

In the equations below representing the respective reactions, the organomagnesium reactant is represented as RMgCl. It is to be understood however that in each instance the complex RMgCl·nQ defined above is equally applicable and may be substituted therefor.

ARYL MAGNESIUM CHLORIDE REAGENTS (A) *Reactions with carbonic acid derivatives*

Aryl magnesium chloride reagents will react with carbonic acid derivatives as follows:

(1)   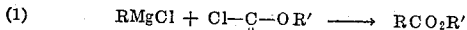

(2)   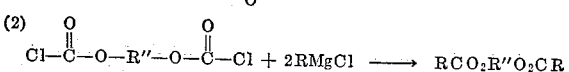

wherein R' is a monovalent radical and may be alkyl, aryl, alkenyl, aralkyl or alkaryl, R" is a divalent radical, and R is an aryl as follows:

(2a)

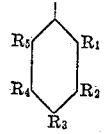

wherein $R_1$, $R_2$, $R_3$, $R_4$ and $R_5$ may be hydrogen; chlorine; alkyl radicals, substituted or unsubstituted; aryl radicals, substituted or unsubstituted; alkoxy radicals, substituted or unsubstituted; or aryloxy radicals, substituted or unsubstituted; and wherein any two or more adjacent hydrocarbon groups may be linked or condensed to form a cyclic saturated, or further condensed aromatic ring or a combination of the two, with the limitation that $R_1$, $R_2$, $R_3$, $R_4$ and $R_5$ may not themselves be substituted by functional groups reactive to aryl magnesium chlorides. The nuclear chlorine atoms, namely, those directly attached to the aryl radical may range from 1 to 5 for each aryl radical.

Among the aryl magnesium chloride reagents of this invention are organomagnesium chlorides of the following: phenyl, tolyl, biphenyl (xenyl), terphenyl, naphthyl, anthracyl, chlorophenyl, phenanthryl, polychlorophenyl, polychlorobiphenyl, xylyl, 2 (or 3, 4, 5, 6, 7 or 8) phenyl-naphthyl, anisyl, phenetyl, pyrenyl, cadalenyl, perylenyl, acenaphthalenyl chrysenyl, picenyl, chlorotolyl, tetralinyl and so forth.

Among the chlorocarbonates may be mentioned the chlorocarbonates of formula

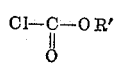

wherein R' is methyl, ethyl, vinyl, allyl, propenyl, phenyl, tolyl, xylyl, xenyl, benzyl, phenlyethyl, cinnamyl or methylbenzyl.

Tertiary alcohols can be obtained by further reaction:

(3)

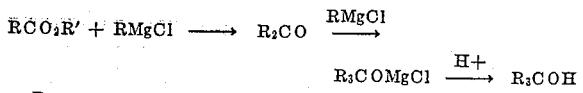

By proper control $R_2CO$ may be isolated.

A dialkyl carbonate $R'OCO_2R'$ performs similarly:

(4)

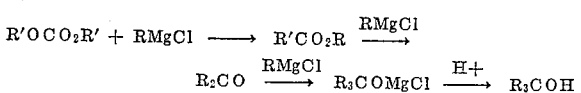

Further reactions with chlorocarbonates and carbonates are as follows:

(5)   $RMgCl + ClCO_2R' \rightarrow RCO_2R' \rightarrow R_2CO \rightarrow R_3COH$ (6)   $RMgCl + R'OCO_2R' \rightarrow RCO_2R' \rightarrow R_2CO \rightarrow R_3COH$ wherein R' may be alkyl, aryl, alkenyl and aralkyl, and wherein R is defined as:

(6a)

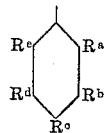

wherein $R^a$, $R^b$, $R^c$, $R^d$, and $R^e$ may be the same or different substituents as long as they do not react with the aryl magnesium chloride reagent. They may be hydrogen; chlorine; alkyl, such as methyl, ethyl, etc.; alkenyl, such as vinyl, allyl, propenyl, etc.; aryl, such as phenyl, tolyl, xylyl, xenyl, etc.; aralkyl, such as benzyl, phenylethyl, cinnamyl, methylbenzyl, etc.; heterocyclic, such as thienyl, thenyl, furyl, etc.; alkoxy, such as methoxy, ethoxy, allyloxy, etc.; aryloxy, such as phenoxy, tolyloxy, xenyloxy, etc.; and dialkylamino, such as dimethylamine, diethylamino, etc.

Further chlorocarbonate and carbonate reactions occur with chlorophenyl magnesium chloride or substituted chlorophenyl magnesium chlorides as follows:

(7)   $RMgCl + ClCO_2R' \rightarrow RCO_2R' \rightarrow R_2CO \rightarrow R_3COH$ (8)   $RMgCl + R'OCO_2R' \rightarrow RCO_2R' \rightarrow R_2CO \rightarrow R_3COH$ wherein R is defined as:

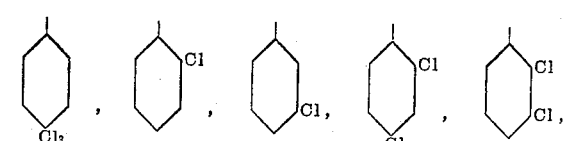
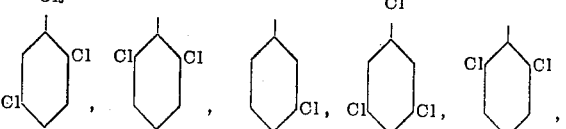
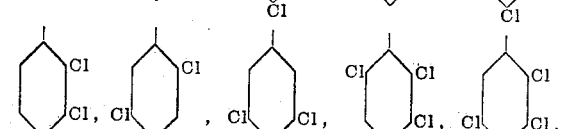
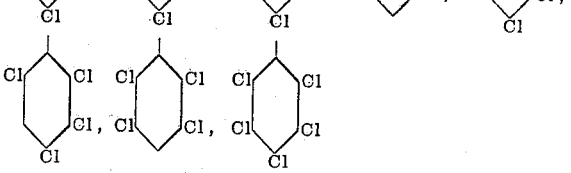

In the above radicals, any organic monovalent radical may be present in any position not containing chlorine. In addition, fluorine; dialkylamino, alkoxy, alkenyloxy; alkylidene dioxy in open ortho positions; or aryloxy may be present. Any of these substituents may be used provided no group present is reactive to the aryl magnesium chloride reagent.

Xenylmagnesium chloride will react with chlorocarbonates and carbonates as follows:

(9)

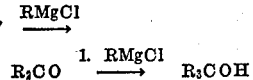

$$R_2CO \xrightarrow[\text{2. H}^+]{\text{1. RMgCl}} R_3COH$$

(10)

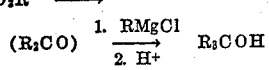

$$(R_2CO) \xrightarrow[\text{2. H}^+]{\text{1. RMgCl}} R_3COH$$

R is defined in the above reactions as a xenyl radical, substituted or unsubstituted. The raw materials for preparing the RMgCl by the above-mentioned process might also contain some chlorinated terphenyls. Thus, R may be:

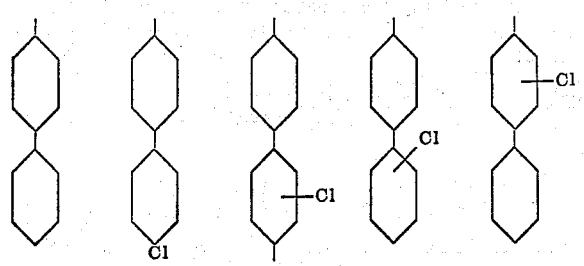
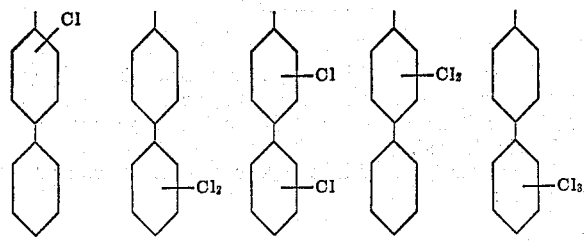
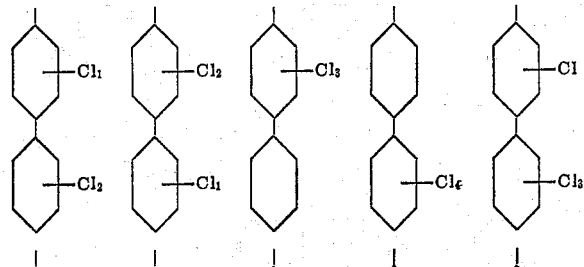
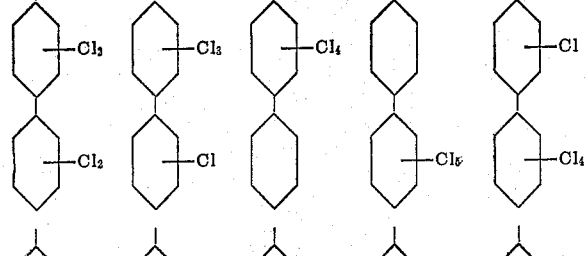
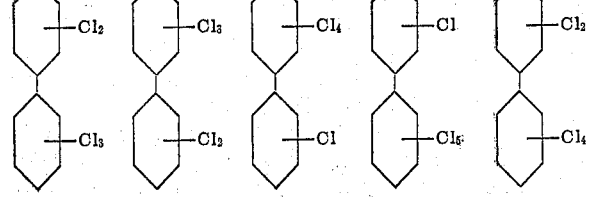
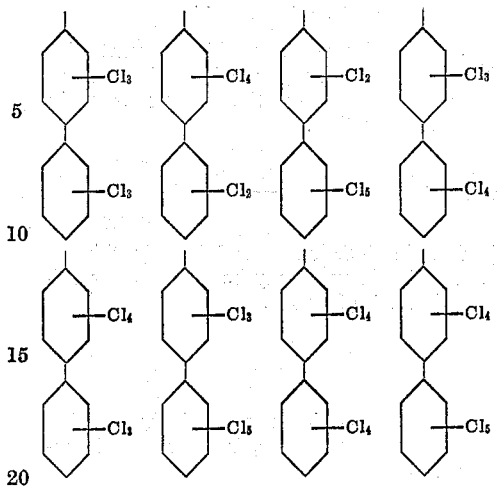

The bond to the magnesium may be ortho, meta or para. Other groups may be present instead of ring hydrogen, including alkyl, alkenyl, aryl, alkaryl, aralkyl, fluorine, alkoxy, alkenoxy, aroxy, dialkylamino, etc., groups.

Bifunctional arylene di(magnesium chloride) reagents react with chlorocarbonates and carbonates as follows:

(11)

$$R(MgCl)_2 + 2ClCO_2R' \longrightarrow R(CO_2R')_2 \xrightarrow{R(MgCl)_2}$$

polymeric ketones $\longrightarrow$ R(MgCl)$_2$ polymeric tertiary alcohols (12)

$$R(MgCl)2 + R'OCO_2R' \longrightarrow R(CO_2R')_2 \xrightarrow{R(MgCl)_2}$$

polymeric ketones $\xrightarrow{R(MgCl)_2}$ polymeric tertiary alcohols

R(MgCl)$_2$ in this reaction is:

where hydrogens on the ring may be replaced by any group not reactive to RMgCl, such as chlorine, fluorine, R'$_2$N—, R'O—, and R', etc., and where R' is a monovalent radical. Two neighboring R' radicals may be cyclicized.

R(MgCl)$_2$ may also be:

where the ring hydrogens may be replaced as above;

where the ring hydrogens may be replaced as above;

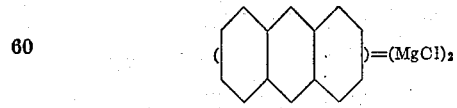

where the ring hydrogens may be replaced as above;

where the ring hydrogens may be replaced as above, or may be any other bivalent group where the bonds from the carbon to the dimagnesium chlorides are those of aromatic carbon to magnesium chloride, where hydrogen may be replaced as described above.

(B) *Reactions with carbon dioxide*

Aryl magnesium chloride reagents will also react with carbon dioxide to yield carboxylic acids. By varying the conditions one can form substituted ketones as in the following general reaction:

(13)
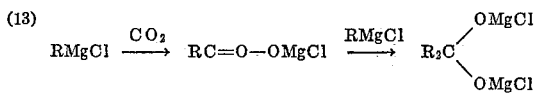

R being defined as in Reactions 1 and 2. In this reaction the second RMgCl used may be the same or different from the first RMgCl used.

Starting with

as prepared by the aforementioned method, the reaction of this product with carbon dioxide, is for a specific example, as follows:

(14)
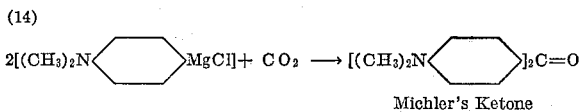

Michler's Ketone

Carbonated aryl magnesium chlorides form substituted benzoic acids, or benzophenones and substituted benzophenones. The reaction is as follows:

(15)
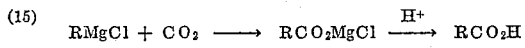

(15a)
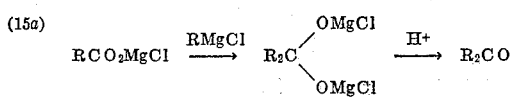

R has the same definition as in Reactions 5 and 6.

Chlorophenyl and substituted chlorophenyl magnesium chlorides may also be carbonated in the same manner as Reactions 15 and 15a. R in this case is defined as in Reactions 7 and 8 as aryl chlorides.

Xenylmagnesium chlorides are used similarly:

(16)
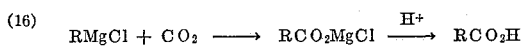

(16a)
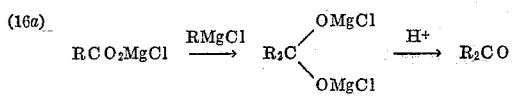

R is defined as chlorinated xenyl as in Reactions 9 and 10.

Bifunctional organomagnesium chloride reagents will react with carbon dioxide yielding dibasic acids and polymers:

(17) $R(MgCl)_2 + CO_2 \rightarrow R(CO_2H)_2$

(18)
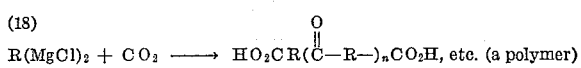

R is defined as in Reactions 11 and 12.

(C) *Reactions with carbon disulfide and carbon oxysulfide*

Aryl magnesium chloride reagents will react with carbon disulfide and carbon oxysulfide to yield compounds according to the following:

(19) $RMgCl + CS_2 \rightarrow RCS_2H$ (19a)
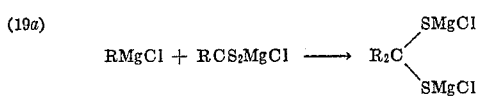

(20) $RMgCl + COS \rightarrow RCOSH$ (20a)
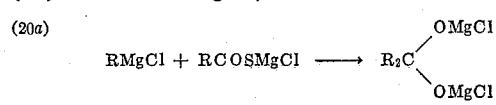

Chlorophenyl magnesium chlorides react with carbon disulfide and oxysulfide as follows:

(21)
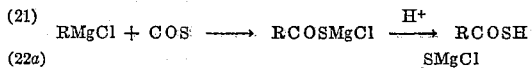

(22a)
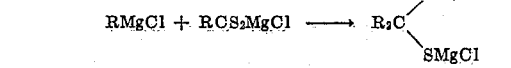

(22)
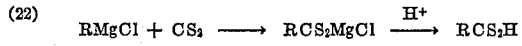

(21a)
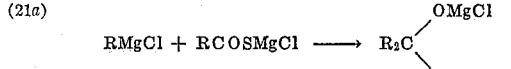

wherein R is defined as in Reactions 7 and 8.

Xenylmagnesium chlorides react in a similar way:

(23)
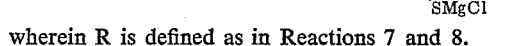

(23a)
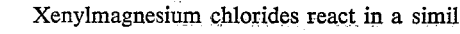

(24)

(24a)
$RCS_2MgCl \xrightarrow{RMgCl} R_2CS$ wherein R is defined as in Reactions 9 and 10.

Bifunctional arylene magnesium chlorides referred to above also react with carbon disulfide and carbon oxysulfide:

(25) $R(MgCl)_2 + CS_2 \rightarrow R(CS_2H)_2$

(26) $R(MgCl)_2 + COS \rightarrow R(CSOH)_2$

(27)
$R(MgCl)_2 + CS_2 \rightarrow HS_2CR(\overset{S}{\overset{\|}{C}}-R)_nCS_2H$ (polymer)

R is defined as in Reactions 11 and 12.

HETEROCYCLIC MAGNESIUM CHLORIDE REAGENTS (A) *Reactions with carbonic acid derivatives*

Thiophenyl, benzothiophenyl, and dibenzothiophenyl magnesium chlorides react with carbonic acid derivatives, producing $R_3COH$, where R is the heterocyclic radical as herein defined.

Among the types of heterocyclic magnesium chlorides used are:

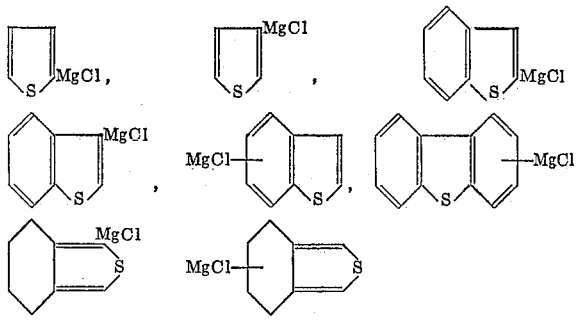

When R is a heterocyclic radical, it may contain at least one chlorine atom attached to a ring carbon atom, but it may not contain a hydrogen atom attached to a ring nitrogen of the heterocyclic radical. More specifically these heterocyclic chlorides contain ring oxygen and/or sulfur and/or tertiary nitrogen. The heterocyclic compounds may contain one ring or be polynucleate in structure. Any and all of the hydrogen atom of the nucleus or nuclei may be replaced by chlorine, fluorine, monovalent organic radicals, and polyvalent radicals (usually divalent) arranged in such a manner as to form condensed rings.

The organic substituents may include alkyl (substituted or unsubstituted) radicals, aryl (substituted or unsubstituted) radicals, alkoxy (substituted or unsubstituted) radicals, or aryloxy (substituted or unsubstituted) radicals, of which any two adjacent hydrocarbon groups may be linked or condensed to form a cyclic saturated or further condensed aromatic ring, or a combination of the two, with the limitation that the substituents may not themselves be functional groups reactive to heterocyclic magnesium chloride.

Accordingly, the chlorine of RCl must be linked to a carbon in an aromatic ring or a carbon in the heterocyclic pseudoaromatic ring.

Pyridylmagnesium chlorides may also be reacted with chlorocarbonates and carbonates. In this case, RMgCl reacts with ClCO$_2$R' and R'OCO$_2$R' according to the aforementioned reactions 1 and 4, wherein R is a pyridyl, quinolyl, isoquinolyl, acridyl, or other such nitrogen heterocyclic radicals such as:

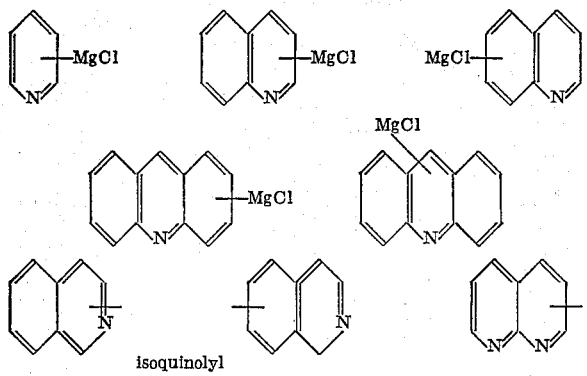

isoquinolyl where any ring hydrogen may be replaced by chlorine; fluorine or any organic group or groups which are not reactive to RMgCl, or condensed rings or a combination of all or any two or more than two of them.

Other types of heterocyclic radicals which react in this manner include:

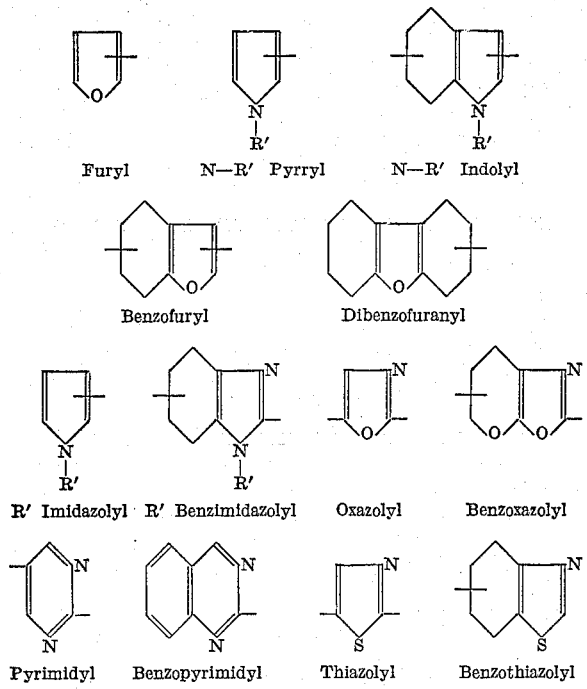

Furyl    N—R' Pyrryl    N—R' Indolyl

Benzofuryl    Dibenzofuranyl

R' Imidazolyl  R' Benzimidazolyl  Oxazolyl  Benzoxazolyl

Pyrimidyl  Benzopyrimidyl  Thiazolyl  Benzothiazolyl

Triazinyls  Pyrazinyl  Pyridazinyl

The free bonds in the above radicals indicate where a magnesium chloride group is attached, more than one free bond representing alternative positions.

(B) *Reactions with carbon dioxide*

Using R as defined in the aforementioned thiophenyl, benzothiophenyl and dibenzothiophenyl magnesium chloride reactions, the following reactions take place:

(28)    $RMgCl + CO_2 \rightarrow RCO_2(MgCl)$

(29)    $RMgCl + CO_2 \rightarrow R_2C(OMgCl)_2 \rightarrow R_2CO$

More specifically:

(30)

(31)

(32)

Other heterocyclic magnesium chlorides as defined, similarly react with carbon dioxide:

(33)
$$RMgCl \xrightarrow{CO_2} R-\overset{O}{\underset{\|}{C}}-O-MgCl \xrightarrow{RMgCl} R_2C\begin{smallmatrix}OMgCl\\ \\OMgCl\end{smallmatrix}$$

wherein RMgCl is defined as a pyridylmagnesium chloride of the type discussed in (A) of heterocyclicmagnesium chloride reagents.

(C) *Reactions with carbon disulfide and carbon oxysulfide*

Thiophenyl, benzothiophenyl and dibenzothiophenylmagnesium chloride reagents react with carbon disulfide and carbon oxysulfide as follows:

(34)    $RMgCl + CS_2 \longrightarrow RCS_2MgCl \xrightarrow{H^+} RCS_2H$

(35)    $RMgCl + CS_2 \rightarrow RCS_2MgCl \rightarrow RC(SMgCl)_2$

(36)
$$RMgCl + COS \longrightarrow RCSOMgCl \xrightarrow{RMgCl} R_2C\begin{smallmatrix}OMgCl\\ \\SMgCl\end{smallmatrix}$$

wherein RMgCl is defined as a heterocyclic thiophenyl, benzothiophenyl or dibenzothiophenylmagnesium chloride of the type discussed in (A) of heterocyclicmagnesium chloride reagents.

Other heterocyclic type reagents also react with carbon disulfide and carbon oxysulfide as follows:

(37)    $RMgCl + CS_2 \rightarrow RCS_2H$ (37a)
$$RMgCl + CS_2 \longrightarrow RCS_2MgCl \xrightarrow{RMgCl} R_2C\begin{smallmatrix}SMgCl\\ \\SMgCl\end{smallmatrix}$$

(38)    $RMgCl + COS \rightarrow RCOSH$ (38a)
$$RMgCl + COS \longrightarrow RCSOMgCl \xrightarrow{RMgCl} R_2C\begin{smallmatrix}OMgCl\\ \\SMgCl\end{smallmatrix}$$

wherein R is as previously defined for heterocyclicmagnesium chlorides.

VINYL TYPE MAGNESIUM CHLORIDE REAGENTS (A) *Reactions with carbonic acid derivatives*

Vinyl magnesium chloride may also be reacted with chlorocarbonates and carbonates. A specific illustration employing vinyl magnesium chloride is as follows:

(39)    $CH_2=CHMgCl + ClCO_2R \rightarrow CH_2=CHCO_2R$

(40)
$$CH_2=CHMgCl + (RO)_2CO \longrightarrow ROOCCH=CH_2 \xrightarrow{CH_2=CHMgCl}$$
$$(CH_2=CH)_2CO \xrightarrow[H^+]{CH_2=CHMgCl} (CH_2=CH)_3COH$$

(B) *Reactions with carbon dioxide*:

(41) $CH_2=CHMgCl + CO_2 \rightarrow CH_2=CHCO_2H$

(42) $CH_2=CHMgCl + CO_2 \rightarrow (CH_2=CH)_2CO$

Vinylmagnesium chloride may be more particularly described by the formula:

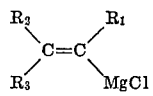

wherein $R_1$, $R_2$ and $R_3$ may be the same or different, and may be hydrogen, or any hydrocarbon group, aliphatic or aromatic. In addition, $R_1$ may be chlorine, in which case this chlorine may, under suitable conditions, react with additional magnesium to form a dimagnesium compound. They may also be hydrocarbon groups with functional group substituents, provided that the latter are inert to magnesium and to vinyl magnesium chloride; $R_1$ may be cyclicized with $R_2$ or $R_3$ as, for example, in the compound:

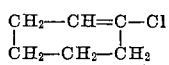

Typical of vinyl chlorides which may be used in the practice of this invention are 1,1 dichloro-1-propene, 1 chloro-1-propene, 2 chloro-1-propene, 3 chloropentene-2, 1 (or 2) chloropentene-1,α (or β) chlorostyrene, 1 chloroisobutene -1, 2 methyl -3- chlorobutene -2,α chloroethylene-cyclohexane, 1-chlorocyclohexene, 1 chlorobutadiene 1, 3, p-methoxy α chlorostyrene, p-methoxy β chlorostyrene, etc.

In the general case, these vinylmagnesium chlorides may replace the vinylmagnesium chlorides in reactions 39, 40, 41 and 42. Among the vinylmagnesium chlorides to be used in these reactions are the following:

(43) 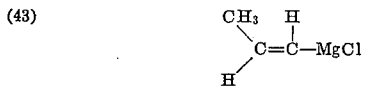

(44) 

(45) 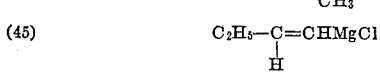

(46) 

(47) 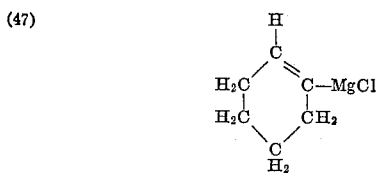

(48) 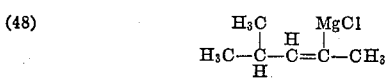

(49) 

(C) *Reactions with carbon dioxide and carbon oxysulfide*

Vinylmagnesium chlorides react with carbon disulfide and oxysulfide to yield:

(50) 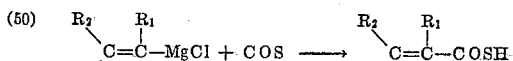

(51) 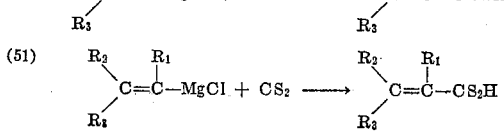

A further reaction is:

(52) 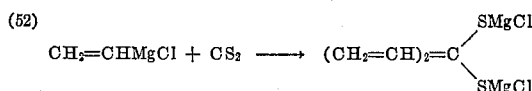

(53) 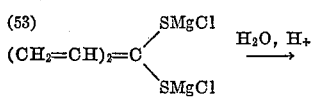

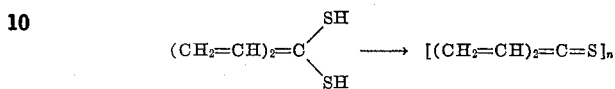

EXAMPLE 1.—PREPARATION OF PHENYLMAGNESIUM CHLORIDE

A flask containing magnesium turnings (24.3 grams) was flushed with nitrogen. An initiation mixture of ethyl bromide (2 ml.) and a small iodine crystal were added to the flask with a portion (10 ml.) of a mixture of chlorobenzene 1 mole (112.6 grams) and tetrahydrofuran 3 moles (216.3 grams). Stirring was applied to the reaction mixture and the reaction temperature reached 60° C. The remainder of the chlorobenzene/tetrahydrofuran mixture was added to the flask over a period of about one and a half hours. Heat was applied during this time and the reaction mixture refluxed. Refluxing was carried on for a total of six hours with the temperature reaching as high as 84° C. The reaction product was phenylmagnesium chloride. A similar result is obtained when tetrahydropyran, 2-methyltetrahydrofuran, 2-ethoxymethyltetrahydrofuran, and 2-ethoxytetrahydropyran, are each substituted for tetrahydrofuran.

EXAMPLE 2.—PREPARATION OF BENZOIC ACID

The reaction mixture of Example 1 was added to a slurry of Dry Ice in ether. Excess ether was then added, and on standing, a white precipitate (RCOOMgCl) was formed. The precipitate was vacuum dried and then dissolved in water (200 ml.). On heating this solution, two distinct layers formed which were acidified with concentrated hydrochloric acid. Further heating caused most of the solvent to evaporate, leaving a crystalline precipitate in the remaining solvent. The precipitate was recovered by filtration and drying. A yield of 84.6% benzoic acid was found.

EXAMPLE 3.—PREPARATION OF BENZOIC ACID

Phenylmagnesium chloride was prepared according to the procedure of Example 1 using the same quantities of ingredients. The reaction was completed in about four hours.

Using this phenylmagnesium chloride reaction product the procedure of Example 2 was followed. A yield of 84.0% benzoic acid was recovered.

EXAMPLE 4.—PREPARATION OF P-TOLUIC ACID

The procedures of Example 3 were followed using the same quantities of ingredients, but substituting p-chlorotoluene 1 mole (126.6 grams) for chlorobenzene 1 mole (112.6 grams) in this case to prepare the intermediate, p-magnesium chlorotoluene.

The white precipitate formed on carbonation in this case, however, was recovered by decanting the supernatant liquid and dissolving the solid in water (300 ml.) at room temperature. An upper organic layer and a lower aqueous layer were formed. On separation the aqueous layer was acidified with concentrated hydrochloric acid, agitated and heated. The product was cooled. On reheating, crystals were formed which were recovered by filtration. A yield of 76% para-toluic acid was found.

EXAMPLE 4A

The procedures in Example 3 are followed except that the arylmagnesium chloride reagents used are the organomagnesium chlorides of the following: xenyl, terphenyl, naphthyl, anthracyl, chlorophenyl, phenanthryl, xylyl, 2

(or 3, 4, 5, 6, 7, or 8) phenylnaphthyl, anisyl, phenetyl, pyrenyl, cadalenyl, perylenyl, acenaphthalenyl, chrysenyl, picenyl, chlorotolyl, and tetralinyl. The corresponding carboxylic acids are recovered.

EXAMPLE 5.—PREPARATION OF VINYLMAGNESIUM CHLORIDE

A flask containing magnesium turnings 1 gram atom (24.3 grams) and tetrahydrofuran (300 ml.) was purged with nitrogen. An initiation mixture of ethyl bromide (4 ml.) and a small iodine crystal were then added to the flask. Vinyl chloride was bubbled through the reaction solution. Heat and stirring were applied. The most favorable reaction temperature was found to be about 50° C. The mixture was refluxed for about seven hours and then diluted with tetrahydrofuran (1000 ml.). The yield of vinylmagnesium chloride determined by titration was 98.5%.

EXAMPLE 6.—PREPARATION OF ACRYLIC ACID

The vinylmagnesium chloride/tetrahydrofuran solution (980 ml.) from Example 5 was poured over an excess of powdered Dry Ice. The reaction product was acidified with a solution of hydrochloric acid 1.1 moles (37%). A precipitate was formed to which diethylbenzene (500 ml.) was added. After water (500 ml.) was added the precipitate dissolved. The liquid formed two distinct layers. The organic layer was distilled and a check of the index of refraction qualitatively identified the distillate as acrylic acid (1.4223 at 22° C.).

EXAMPLE 7.—PREPARATION OF VINYLMAGNESIUM CHLORIDE

The procedure of Example 5 was followed using the same amounts of ingredients except that only two milliliters of ethyl bromide were used. In this case, the tetrahydrofuran was added to the flask over a period of about three and a half hours. Titration of the reaction product showed a 97.5% yield of vinylmagnesium chloride. A similar result is obtained when tetrahydropyran is substituted for the tetrahydrofuran.

EXAMPLE 8.—PREPARATION OF ACRYLIC ACID

The vinylmagnesium chloride/tetrahydrofuran solution (980 ml.) from Example 7 was poured over an excess of powdered Dry Ice. The resulting solution was acidified with hydrochloric acid 37% (95 ml.), which caused a precipitate to form. Water (200 ml.) was added to dissolve the precipitate. The resulting liquid formed two layers. The organic layer was separated and distilled. A yield of 52.6% acrylic acid was recovered.

EXAMPLE 8A

The procedures in Examples 8 are followed except that the vinylic magnesium chloride reagents used are the organomagnesium chloride reagents of the following: 1,1 dichloro-1-propene, 1 chloro-1-propene, 2 chloro 1-propene, 3 chloropentene-2, 1(or 2) chloropentene-1, α (or B) chlorostyrene, 1 chloroisobutene-1, 2 methyl-3-chlorobutene-2, α-chloroethylene-cyclohexane, 1-chlorocyclohexene, 1 chlorobutadiene 1,3, p-methoxyαchlorosyrene, p-methoxyαchlorostyrene. In each case the corresponding vinylic acid is produced.

EXAMPLE 9.—PREPARATION OF 1,4 DI(MAGNESIUM CHLORIDE) BENZENE

A flask containing magnesium turnings 2 gram atoms (48.6 grams) and an iodine crystal was purged with nitrogen. Ethyl ether (2 ml.) and ethyl bromide (2 ml.) were added to the flask to initiate the reaction. A mixture of p-dichlorobenzene 1 mole (148.0 grams) and tetrahydrofuran 3 moles (216.0 grams) was added to the flask over a period of an hour and a half. The temperature reached 87° C. and the mixture refluxed for about eight hours. Titration showed a yield of about 91.0% 1,4 di(magnesium chloride) benzene. A similar result is obtained when tetrahydropyran is substituted for tetrahydrofuran.

EXAMPLE 10.—PREPARATION OF P-CHLORO-BENZOIC ACID

The 1,4 di(magnesium chloride) benzene/tetrahydrofuran solution from Example 9 was added to a Dry Ice ethyl ether slurry. The solution after standing evaporated to dryness. The deposit was treated with potassium hydroxide 15% (500 ml.) and was filtered. The filtrate was neutralized with hydrochloric acid. The precipitate which formed was treated with ethyl alcohol (200 ml.) refluxed and filtered. Crystals of p-chlorobenzoic acid were present.

EXAMPLE 11.—PREPARATION OF PARACHLOROPHENYLMAGNESIUM CHLORIDE

The procedure of Example 9 was followed using the same amounts of ingredients except that 2 moles (296.0 grams) of paradichlorobenzene and 6 moles (432.0 grams) of tetrahydrofuran were used. The reaction product in this case was washed with tetrahydrofuran which has been previously dried over sodium hydroxide. Titration showed a 94.6% yield of parachlorophenylmagnesium chloride.

EXAMPLE 12.—PREPARATION OF MAGNESIUM CHLORIDE P-CHLOROBENZOATE

A portion of the parachlorobenzenemagnesium chloride/tetrahydrofuran solution (230 ml.) from Example 11 was added to a Dry Ice slurry in diethyl ether. Potassium hydroxide 15% (500 ml.) was then added, and the mixture was filtered. Hydrochloric acid, added to the filtrate, caused a precipitate to form. The precipitate was filtered, dried and the residue acidified with hydrochloric acid. The resulting precipitate was again filtered and dried. A yield of 76.4% magnesium chloride parachlorobenzoate was recovered.

EXAMPLE 12A

The procedure of Example 12 is followed except that in place of the parachlorophenylmagnesium chloride the arylmagnesium chlorides under Reactions 1, 2, 5 and 6 the chlorinated arylmagnesium chlorides of Reactions 7 and 8 and the xenylmagnesium chloride compounds of Reactions 9 and 10 are used. The chloromagnesium salt of the corresponding acids are produced.

EXAMPLE 13.—PREPARATION OF MAGNESIUM CHLORIDE M-CHLOROBENZENE

The procedure of Example 11 was followed using magnesium turnings 0.5 mole (12.2 grams), m-dichlorobenzene 0.5 mole (72.0 grams) and tetrahydrofuran 1.5 moles (108.0 grams). Titration of the reaction product showed a yield of 72.7% m-chlorophenylmagnesium chloride.

EXAMPLE 14.—PREPARATION OF META-CHLOROBENZOIC ACID

A portion of the m-chlorophenylmagnesium chloride from Example 13 was poured over cracked Dry Ice. The solution was next partially evaporated and an equal volume of water was added to the remaining solution. Concentrated hydrochloric acid was next added. After further heating, the solution was allowed to stand. Crystals which formed were filtered, washed and dissolved by heating in ethyl alcohol. An organic layer which formed was separated and cooled. Crystals formed once more were oven dried. A yield of 72 grams meta-chlorobenzoic acid was recovered.

EXAMPLE 14A

The procedure of Example 11 was followed except that the following chlorobenzenes are substituted for the paradichlorobenzene of this example; 1,2,4, trichloro, 1,2,3, trichloro, 1,3,5, trichloro, 1,2,3,4, tetrachloro, 1,2,4,5, tetrachloro, 1,2,3,5 tetrachloro, pentachloro, and hexachlorobenzene. To each of the reagent solutions thus produced is added cracked Dry Ice as in Example 14 and the solution is worked up as described in Example 14. The corresponding chlorobenzoic acids are produced.

EXAMPLE 14B

The procedure of Example 14a is followed except that chlorinated xenylmagnesium chlorides listed under Reaction 10 are first made from the corresponding xenylchlorides instead of the reagent of the chlorinated benzenes. The products produced are the corresponding carboxylic acid of the xenylchlorides.

EXAMPLE 15.—PREPARATION OF BENZOPHENONE

A flask containing magnesium turnings 1 gram atoms (24.3 grams) and an iodine crystal was purged with nitrogen. Ethyl ether (2 ml.), ethyl bromide (2 ml.) and 20 ml. of a mixture of chlorobenzene 1 mole (112.6 grams) and tetrahydrofuran 3 moles (216.3 grams) were added to the flask to initiate the reaction. Stirring was applied, and the remainder of the chlorobenzene/tetrahydrofuran mixture was added over a period of about one hour. Heat was added to maintain refluxing. The reaction was completed in about three hours yielding phenylmagnesium chloride.

Carbon dioxide was then bubbled through the phenylmagnesium chloride for about an hour during which time an ice bath was applied to the flask. A Gilman Color Test I was negative. The system was next flushed with nitrogen and heated to reflux.

A second quantity of phenylmagnesium chloride was prepared according to the procedure outlined above using the same amount of ingredients. This second quantity was transferred slowly to the refluxing carbonated product of the first phenylmagnesium chloride yield. Refluxing continued with added heat and stirring. A Gilman Color Test I after about an hour was negative. The mixture was cooled and hydrolyzed with a 1:4 solution of hydrochloric acid. The organic layer was separated and extracted with sodium hydroxide (15% solution). The reaction product was then evaporated. Upon vacuum distillation of the residue, a yield of 42.8% benzophenone was recovered.

EXAMPLE 15A

Following the procedure in the first paragraph of Example 15 except that the appropriate aryl chloride is substituted for the chlorobenzene, the organomagnesium chlorides of the following are produced; tolyl, xenyl, terphenyl, naphthyl, anthracyl, phenanthryl, xylyl, 2 (or 3, 4, 5, 6, 7 or 8) phenylnaphthyl, anisyl, phenetyl, pyrenyl, cadalenyl, perylenyl, acenaphthalenyl, chrysenyl, picenyl, chlorotolyl, tetralinyl. The procedures of paragraphs 2 and 3 of Example 15 are then followed except that the appropriate arylmagnesium chloride is substituted for the phenylmagnesium chlorides. The corresponding symmetrical ketones are thus produced.

EXAMPLE 15B

The procedures of Example 15A are followed except that polychlorobenzenes under Reactions 7 and 8 of the specification are used in place of the aryl chlorides of Example 15A. The corresponding symmetrical ketones are produced.

EXAMPLE 15C

The procedures of Example 15A are followed excepting that the chlorinated xenyl compounds under reaction 10 of the specification are substituted for the arylchlorides of Example 15A. The corresponding symmetrical ketones are produced.

EXAMPLE 16.—PREPARATION OF THIENYLMAGNESIUM CHLORIDE

Flask was charged with 24.3 grams (1 g. atom) of magnesium turnings, and purged with nitrogen. Ten (10 ml.) of tetrahydrofuran was added, followed by an initiation mixture consisting of 2 ml. of ethyl bromide and one crystal of iodine. Reaction set in immediately. There was added slowly a mixture consisting of 118.5 grams (1 mole) of 2-chlorothiophene and 216.0 grams (3 moles) of tetrahydrofuran, while stirring slowly. During this addition external heating was initiated and maintained until temperature reached about 72° C. Thereafter, the reaction proceeded exothermically, the pot temperature reaching as high as 82° C. The addition of the 2-chlorothiophene/tetrahydrofuran mixture was completed in about an hour. Heat was supplied for an additional half-hour after which all the magnesium had been consumed and the reaction was complete. After cooling to room temperature, the solution produced was diluted with sufficient tetrahydrofuran to permit easy handling, and the mixture was titrated to determine the yield of thienylmagnesium chloride. This yield was 84.7%.

EXAMPLE 16A

The thienylmagnesium chloride reagent of Example 16 is added to 1 mole of ethyl chlorocarbonate in tetrahydrofuran. Ethyl 2-thienylcarboxylate is formed.

EXAMPLE 17.—PREPARATION OF α-PYRIDYL MAGNESIUM CHLORIDE

Flask was charged with 21.5 grams (0.885 g. atom) of magnesium turnings and a small crystal of iodine, and purged with nitrogen. A mixture consisting of 100.0 grams (0.885 mole) of 2-chloropyridine dissolved in 216 gm. (3 moles) of tetrahydrofuran was prepared. Ten (10) ml. of this mixture was added to the magnesium charge, and the reaction initiated with 2 ml. of ethyl bromide. Thereafter the remainder of the 2-chloropyridine/tetrahydrofuran mixture was added slowly with stirring, but without external heating. The addition was complete after about an hour, during which period the mixture was refluxing at a pot temperature of about 65° C., the rate of refluxing being controlled by cooling in a water bath. The heater was then turned on to maintain refluxing for about three hours, and in this period 300 ml. additional tetrahydrofuran was added. After cooling to room temperature and dilution, the reaction mixture was titrated to determine yield of α-pyridyl magnesium chloride. This yield was found to be 55%.

EXAMPLE 17A

The α-pyridylmagnesium chloride reagent of Example 17 is added to one mole of $CS_2$ in tetrahydrofuran while cooling. The temperature is kept at 20° C. α-pyridyldithiocarboxylic acid is formed.

EXAMPLE 18.—PREPARATION 2-QUINOLYL MAGNESIUM CHLORIDE

Flask was charged with 14.8 grams (0.61 g. atom) of magnesium turnings and a small iodine crystal, and purged with nitrogen. A mixture consisting of 100 grams (0.61 mole) of 2-chloroquinoline dissolved in 131.8 grams (1.83 moles) of tetrahydrofuran was prepared. Ten (10) ml. of this mixture was added to the magnesium charge and the reaction initiated with 2 ml. of ethyl bromide. Thereafter, the remainder of 2-chloroquinoline/tetrahydrofuran mixture was added slowly with stirring. The reaction started immediately without the application of heat, the pot temperature reaching about 75° C., which is the refluxing temperature. The reaction mixture was refluxed for about one hour, after which 100 ml. tetrahydrofuran was added and the heater turned on for about 3 more hours. One hundred (100 ml.) tetrahydrofuran was added for thinning purposes, the reaction mixture cooled to room temperature and titrated to determine the yield of 2-quinolyl magnesium chloride. This yield was found to be about 47.2%.

EXAMPLE 18A $CO_2$ is slowly bubbled into one-half of the 2-quinolylmagnesium chloride solution of Example 18 at temperature below 15° C. The rest of the reagent of Example 18 is added to this mixture at reflux temperature. Bis-2-quinolyl ketone is formed.

EXAMPLE 19.—PREPARATION OF 6-QUINOLYL MAGNESIUM CHLORIDE

Flask was charged with 14.8 gms. (0.61 g. atom) of magnesium turnings and a small iodine crystal, and purged with nitrogen. A mixture consisting of 100 grams (0.61 mole) of 6-chloroquinoline dissolved in 144 grams (2 moles) of tetrahydrofuran was prepared and 10 ml. of this mixture was added to the charge in the flask plus 2 ml. of ethyl bromide, whereby the reaction was immediately initiated. The rest of the mixture of 6 - chloroquinoline/tetrahydrofuran was then added slowly, while heating to reflux and while stirring. This addition was completed in about one hour, and 100 ml. tetrahydrofuran was added thereto. The reaction mixture was then heated for an additional three hours, after which time, 200 additional ml. tetrahydrofuran was added, and the reaction mixture was cooled. The reaction mixture was thinned with tetrahydrofuran for easy handling. Titration indicated a yield of 61.6% 6-quinolyl magnesium chloride.

EXAMPLE 20.—PREPARATION OF 8-QUINOLYL MAGNESIUM CHLORIDE

Flask was charged with 14.8 gms. (0.61 g. atom) of magnesium turnings and a small iodine crystal, and purged with nitrogen. A mixture consisting of 100 grams (0.61 mole) of 8-chloroquinoline dissolved in 144 grams (2 moles) of tetrahydrofuran was prepared and 10 ml. of this mixture was added to the charge in the flask plus 2 ml. of ethyl bromide whereby the reaction was instantly initiated. The rest of the 8-chloroquinoline/tetrahydrofuran mix was then added slowly with agitation and the temperature rose to a reflux temperature of 75° C. This addition was completed in about one-half hour. Thereafter, 100 ml. tetrahydrofuran was added and the heat was turned on for three additional hours. Another 100 ml. tetrahydrofuran was added and the reaction mixture heated for another three (3) hours. Titration of the reaction mixture, cooled to room temperature and thinned with tetrahydrfuran, indicated a yield of 58.9% 8-quinolyl magnesium chloride.

EXAMPLE 20A $CO_2$ gas is added to the reagent of Example 19 under a temperature of 15° C. The reagent of Example 20 is then added to this mixture at reflux temperature. This reaction mixture is worked up as in Example 15. 6-quinolyl-8-quinolyl ketone is obtained.

EXAMPLE 21.—PREPARATION OF 2-BENZOXAZOLYL MAGNESIUM CHLORIDE

Flask was charged with 15.8 grams (0.65 g. atom) of magnesium turnings and a small iodine crystal, and purged with nitrogen. A mixture consisting of 100 grams (0.65 mole) of 2-chlorobenzoxazole dissolved in 144 grams (2 moles) of tetrahydrofuran was prepared, and 10 ml. of this mixture was added to the charge in the flask in addition to 2 ml. of ethyl bromide. The rest of the 2-chlorobenzoxazole/tetrahydrofuran mixture was then added slowly while stirring. External heat was applied at the beginning which was turned off since reaction proceeded effectively exothermically, the mixture refluxing at 74° C. It required about one hour to add all of the 2-chlorobenzoxazolyl/tetrahydrofuran mixture. Thereafter, 100 ml. additional tetrahydrofuran was added, whereby the temperature dropped to 43° C. This reaction mixture by titration after thinning with tetrahydrofuran, indicated a yield of about 74% 2-benzoxazolyl magnesium chloride.

EXAMPLE 21A

The 2-benzoxazolyl magnesium reagent for Example 21 is added to 1 mole of ethylchlorocarbonate in tetrahydrofuran. Ethyl 2-benzoxazolyl carboxylate is formed.

EXAMPLE 22.—PREPARATION OF 2 BENZOTHIAZOLYL MAGNESIUM CHLORIDE

Flask was charged with 24.3 grams (1 g. atom) of magnesium turnings and a small iodine crystal, and purged with nitrogen. A mixture consisting of 169.5 grams (1 mole) of 2-chlorobenzothiazole dissolved in 216 grams (3 moles) of tetrahydrofuran was prepared, and 15 ml. of this mixture was added to the charge in the flask in addition to an initiator consisting of 2 ml. of ethyl bromide. The rest of the 2-chlorobenzothiazole/tetrahydrofuran mixture was then added slowly while stirring, this addition requiring about 2 hours. During this period, the exothermic nature of the reaction eliminated the need for external heat, the pot temperature rising to about 74° C. After the addition of all the 2-chlorobenzothiazole/tetrahydrofuran mixture, 200 ml. tetrahydrofuran was added. The reaction mixture was then permitted to cool to room temperature and thinned with tetrahydrofuran for titration. The yield was 79% 2-benzothiazolyl magnesium chloride.

EXAMPLE 22A

The 2-benzothiazolyl magnesium chloride reagent of Example 22 is added to 1 mole of ethyl chlorocarbonate in tetrahydrofuran. Ethyl 2-benzothiazol carbxylate is formed.

EXAMPLE 23.—PREPARATION OF 2-METHYL-BENZOTHIAZOL-5-yl MAGNESIUM CHLORIDE

Flask was charged with 13.25 grams (0.545 g. atom) of magnesium turnings and a small iodine crystal, and purged with nitrogen. A mixture consting of 100 grams (0.545 mole) of 5-chloro-2-methylbenzothiazole dissolved in 108 grams (1.5 mole) of tetrahydrofuran was prepared, and 15 ml. of this mixture was added to the charge in the flask in addition to an initiator consisting of 2 ml. of ethyl bromide. The rest of the 5-chloro-2-methylbenzothiazole/tetrahydrofuran mixture was then added slowly while stirring. During this period external heat was applied, the pot temperature reaching 76.5° C. during this interval. The reaction mixture was then permitted to cool to room temperature, and was thinned with tetrahydrofuran for titration. The yield was 22% 2-methylbenzothiazol-5-yl magnesium chloride.

EXAMPLE 23A

Carbon oxysulfide is added to the 2-methyl benzothiazol-5-yl magnesium chloride reagent of Example 23. The reaction takes place as indicated in Reactions 39 and 39a.

EXAMPLE 24.—PREPARATION OF 6-CHLORO-2-METHOXYACRID-9-yl MAGNESIUM CHLORIDE

Flask was charged with 8.75 grams (0.36 g. atom) of magnesium turnings and a small iodine crystal, and purged with nitrogen. A mixture consisting of 100 grams (0.36 mole) of 6,9-dichloro-2-methoxyacridine slurried in 216.0 grams (3 moles) of tetrahydrofuran was prepared, and 10 ml. of this mixture was added to the charge in the flask in addition to an initiator consisting of 2 ml. of ethyl bromide. The rest of the 6,9-dichloro-2-methoxyacridine/tetrahydrofuran mixture was then added slowly while stirring, this addition requiring about an hour and a half. During this period, external heat was applied, the pot temperature being maintained at around 70° C. After the addition of the 6,9-dichloro-2-methoxyacridine/tetrahydrofuran mixture, the application of external heat was continued for about one and a half hours. Titration of reaction mixture after dilution with tetrahydrofuran indicated a yield of about 68% 6-chloro-2-methoxyacrid-9-yl magnesium chloride.

EXAMPLE 24A

Ethyl chlorocarbonate is added to the 6-chloro-2-methoxy-acrid-9-yl magnesium chloride reagent of Example 24. Ethyl-6-chloro-2-methoxy-acrid-9-yl carboxylate is formed.

EXAMPLE 25.—REACTION OF MAGNESIUM WITH 4,6 DICHLOROPYRIMIDINE

Flask was charged with 4.03 grams (0.166 g. atom) of magnesium turnings and a small iodine crystal, and purged with nitrogen. A mixture consisting of 25 grams (0.166 mole) of 4,6-dichloropyrimidine dissolved in 36 grams (0.50 mole) tetrahydrofuran was prepared, and 5 ml. of this mixture was added to the charge in the flask in addition to an initiator consisting of 0.5 ml. of ethyl bromide. The rest of the 4,6-dichloropyrimidine/tetrahydrofuran mixture was then added slowly while stirring, with the application of external heat. The mixture was refluxed until reaction was completed. The reaction mixture was then diluted with tetrahydrofuran for titration. The yield was 24% of magnesium chloride reagent, some of the magnesium remaining unused in the reaction mixture.

EXAMPLE 25A $CO_2$ gas is added to the reagent produced in Example 25 of a temperature below 10° C. The corresponding chloropyrimidinyl carboxylic acid is formed.

EXAMPLE 26.—REACTION OF MAGESIUM WITH 2-CHLOROFURAN

Flask was charged with 12.2 grams (0.5 g. atom) of magnesium turnings and a small iodine crystal, and purged with nitrogen. Two ml. ethyl bromide and 3 ml. of a mixture consisting of 51.3 grams (0.5 mole) 2-chlorofuran and 108.0 grams (1.5 moles) tetrahydrofuran were added to the charge in the flask. The rest of the mix was added slowly with agitation and with the application of external heat. The mixture was refluxed, cooled and diluted with tetrahydrofuran. The yield of magnesium chloride reagent was 10%.

EXAMPLE 26A $CS_2$ is added to the reagent product in Example 26. The reaction proceeds as indicated in Reaction 38. Dithiofuroic acid is formed.

EXAMPLE 27.—PREPARATION OF 2,5-DI(MAGNESIUM CHLORIDE) THIOPHENE

Flask was charged with 24.3 grams (1.0 g. atom) of magnesium turnings and a small iodine crystal, and purged with nitrogen. Two ml. ethyl bromide and 3 ml. of a mixture consisting of 76.5 grams (0.5 mole) 2,5-dichlorothiophene, and 180.0 grams (2.5 moles) tetrahydrofuran were added to the charge in the flask. The rest of the mixture was added slowly with stirring. The temperature reached as high as 85° C. The mixture was refluxed, and 72 grams (1 mole) tetrahydrofuran was added to the mixture. The mixture was then cooled and diluted to 500 ml. with tetrahydrofuran and titrated. A yield of 76.3% 2,5-di(magnesium chloride) thiophene was found.

EXAMPLE 27A

One half of the 2,5-di(magnesium chloride) thiophene reagent of Example 27 was treated with $CO_2$ gas at under 10° C. The rest of the reagent was then added at reflux temperature. A polymeric product containing the unit

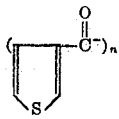

is formed.

EXAMPLE 28.—PREPARATION OF 2-CHLOROTHIOPHENE 5-MAGNESIUM CHLORIDE

The same procedure was followed as in Example 27 using in this case 12.2 grams (0.5 mole) of magnesium, 76.5 grams (0.5 mole) of 2,5-dichlorothiophene and 108.0 grams (1.5 moles) of tetrahydrofuran, with an additional 1 mole of tetrahydrofuran for thinning. The temperature reaches 102° C. in this reaction. After refluxing and cooling, titration under the same conditions as in Example 27 showed a yield of 88.2% of 2-chlorothiophene 5-magnesium chloride.

EXAMPLE 28A

The reagent produced by the reaction of Example 28 is added to 1 mole of ethyl chlorocarbonate. Ethyl 5-chlorothenoate is produced.

EXAMPLE 29.—PREPARATION OF DITHIOBENZOIC ACID

One mole of $CS_2$ is dropped into the chilled reaction mixture of Example 1. The Mg complex is left on ice for about 12 hours and is then decomposed with ice and HCl. The dithiobenzoic acid is recovered by extraction with diethyl ether. It is a red brown oil readily oxidizable in air.

EXAMPLE 30.—PREPARATION OF DITHIOACRYLIC ACID $CS_2$ was dropped into the vinylmagnesium chloride tetrahydrofuran solution of Example 5 in a manner similar to that of Example 29. The reaction mixture was worked up as in Example 29 and the dithioacrylic acid was recovered.

Throughout the specification, the organomagnesium chlorides have sometimes been referred to as the chlorides and sometimes as the organomagnesium chloride complexes. Since the Q complex ($RMgCl \cdot nQ$) is present whenever the organomagnesium chlorides are in the presence of compound Q, it is to be understood that the same substance is referred to all cases.

The present process is useful for preparing many known and also many novel compounds, e. g., organic alcohols, acids, esters, ketones, and thioacids.

While the invention has been described with particular reference to specific embodiments, it is to be understood that it is not limited thereto but is to be construed broadly and restricted solely by the scope of the appended claims.

What is claimed is:

1. A process comprising reacting a carbon-containing compound selected from the class consisting of ethyl chlorocarbonate, carbon disulfide, carbon dioxide and carbon oxysulfide, with an organomagnesium chloride in the presence of compound Q; said organomagnesium chloride being prepared by reacting an organic chloride of the formula RCl, wherein R is selected from the class consisting of vinyl, aryl and aromatic-heterocyclic radicals, with magnesium in compound Q; wherein said compound Q is selected from the class consisting of tetrahydrofuran, tetrahydropyran, 2-ethoxy tetrahydropyran, dihydropyran, tetrahydrofurfuryl ethyl ether and 2-methyl tetrahydrofuran; and wherein said aromatic-heterocyclic radical is selected from the class consisting of thienyl, α-pyridyl, 2-quinolyl, 6-quinolyl, 8-quinolyl, 2-benzoxazolyl, 2-benzothiazolyl, 2-methyl-benzothiazol-5-yl, 6-chloro-2-methoxyacrid-9-yl, 4-chloro-6-pyrimidyl, 2-furyl, 2-chloro-5-thienyl and 2,5-thiophen-di-yl.

2. The process according to claim 1 in which R is the p-vinylphenyl radical.

3. The process according to claim 1 in which R is the phenyl radical.

4. The process according to claim 1 in which R is the vinyl radical.

5. The process according to claim 1 in which Q is tetrahydrofuran.

6. The process according to claim 1 in which Q is 2-methyltetrahydrofuran.

References Cited in the file of this patent

Hepworth: J. Chem. Soc., 119, pages 1249–56 (1921).
Fieser et al.: "Org. Chem.," Reinhold Pub. Co., 1950, page 135. (Copy in Lib. of Congress.)
Helv. Chim Acta, vol. 26, 1943, pages 2251–52.
Kharasch: "Grignard Reactions of Non Metallic Substances," pages 913–60, 1286–88, 45–56 (1954).